US009529383B2

United States Patent
Chun et al.

(10) Patent No.: US 9,529,383 B2
(45) Date of Patent: Dec. 27, 2016

(54) DISPLAY DEVICE AND METHOD OF CONTROLLING THEREFOR

(71) Applicant: LG ELECTRONICS INC., Seoul (KR)

(72) Inventors: Sinae Chun, Seoul (KR); Jihwan Kim, Seoul (KR); Jongho Kim, Seoul (KR); Doyoung Lee, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 14/223,432

(22) Filed: Mar. 24, 2014

(65) Prior Publication Data
US 2015/0234507 A1 Aug. 20, 2015

(30) Foreign Application Priority Data
Feb. 17, 2014 (KR) .................. 10-2014-0017885

(51) Int. Cl.
*G06F 3/041* (2006.01)
*G06F 1/16* (2006.01)
(52) U.S. Cl.
CPC .......... *G06F 1/1616* (2013.01); *G06F 1/1692* (2013.01); *G06F 3/0416* (2013.01)
(58) Field of Classification Search
CPC .... G06F 1/1692; G06F 1/1616; G06F 3/0416; G06F 2203/04104; G06F 3/0412
See application file for complete search history.

(56) References Cited

U.S. PATENT DOCUMENTS

| 7,079,119 | B2 | 7/2006 | Hanson et al. | |
|---|---|---|---|---|
| 7,463,247 | B2 | 12/2008 | Berry | |
| 2010/0277421 | A1 | 11/2010 | Charlier et al. | |
| 2010/0277439 | A1* | 11/2010 | Charlier ............. | G06F 1/1616 345/176 |
| 2010/0295802 | A1* | 11/2010 | Lee .................... | G06F 1/1626 345/173 |
| 2011/0141045 | A1 | 6/2011 | Choi et al. | |
| 2012/0105487 | A1* | 5/2012 | Son .................... | G06F 3/0487 345/671 |

(Continued)

FOREIGN PATENT DOCUMENTS

| EP | 2256611 A2 | 12/2010 |
|---|---|---|
| JP | 2013-175152 A | 9/2013 |

(Continued)

*Primary Examiner* — Alexander Eisen
*Assistant Examiner* — Abhishek Sarma
(74) *Attorney, Agent, or Firm* — Birch, Stewart, Kolasch & Birch, LLP

(57) ABSTRACT

To this end, according to one embodiment, the display device, comprising: a touch sensor unit; a display unit; a transparent display unit; a position sensor unit; and a processor configured to: detect the second touch input by activating the second touch sensor unit and control the first object displayed in the display unit based on the detected second touch input when a first position, and detect the first touch input and the third touch input respectively by activating the first touch sensor unit and the third touch sensor unit, control the first object displayed in the display unit based on the detected first touch input, and control the second object displayed in the transparent display unit based on the detected third touch input when a second position.

17 Claims, 9 Drawing Sheets

(56) References Cited

U.S. PATENT DOCUMENTS

| | | | | |
|---|---|---|---|---|
| 2012/0327133 A1* | 12/2012 | Eguchi | ............... | G09G 3/3611 345/690 |
| 2013/0076591 A1* | 3/2013 | Sirpal | ................... | G06F 3/1438 345/1.3 |
| 2013/0169567 A1* | 7/2013 | Shih | ..................... | G06F 3/0412 345/173 |
| 2015/0236296 A1* | 8/2015 | Yoon | .................. | H01L 51/5234 257/40 |

FOREIGN PATENT DOCUMENTS

| | | |
|---|---|---|
| KR | 10-2012-0075685 A | 7/2012 |
| KR | 10-2013-0113997 A | 10/2013 |

\* cited by examiner

<first position>

↓ detect

<first position>

<fourth position> detect

DISPLAY DEVICE AND METHOD OF CONTROLLING THEREFOR

Pursuant to 35 U.S.C. §119(a), this application claims the benefit of the Korean Patent Application No. 10-2014-0017885 filed on Feb. 17, 2014, which is hereby incorporated by reference as if fully set forth herein.

BACKGROUND OF THE INVENTION

Field of the Invention

The present specification relates to a display device including a transparent display unit sensing a touch input on both sides, and more particularly, to a display device controlling activation of the transparent display unit and touch sensor unit(s) installed in a display unit according to a position of the display device and a method of controlling therefor.

Discussion of the Related Art

As the display device penetration rate is increasing, a display device has enabled users to use such various services as web surfing, electronic financial transaction, and the like as well as interpersonal communication and listening music. As services used to be processed by a computer are provided by the display device, the users can use the aforementioned services with no bounds on time and place.

Yet, since the display device provides a display of a limited size to increase mobility, there may exist inconvenience for a user to use various services. Hence, ongoing efforts to develop a display device in which a transparent display unit is additionally installed are currently underway to enable a user to perform a touch input on both sides. In case of the display device, the user can use a display in wide and various forms. Yet, in case of the display device, in order to prevent the display device from unnecessary power consumption and an incorrect operation, it is necessary to control activation of a touch sensor unit and a display unit of the display device according to a position of the display device.

SUMMARY OF THE INVENTION

Accordingly, the present specification is directed to an apparatus and method thereof that substantially obviate one or more problems due to limitations and disadvantages of the related art.

According to one embodiment, the present specification can provide a display device detecting a position of a device according to whether a transparent display unit is folded and controlling activation of a touch sensor unit according to the detected position and a method of controlling therefor.

According to another embodiment, the present specification can provide a display device detecting a position of a device according to whether a transparent display unit is folded and controlling a display unit or a transparent display unit to display an object according to the detected position and a method of controlling therefor.

According to another embodiment, the present specification can provide a display device detecting a touch input on a transparent display unit and controlling an object displayed in a display unit based on the detected touch input and a method of controlling therefor.

According to the other embodiment, if a partial region of a touch sensor unit is activated, the present specification can provide a display device detecting a touch input in a manner of scaling the activated part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, the display device, comprising: a touch sensor unit configured to sense a touch input; a display unit configured to display a first object and sense a first touch input on a front side of the display unit in a manner of being equipped with a first touch sensor unit; a transparent display unit configured to display a second object and respectively sense a second touch input on a front side of the transparent display unit and a third touch input on a back side of the transparent display unit in a manner of being equipped with a second touch sensor unit and a third touch sensor unit wherein the transparent display unit is connected with the display unit; a position sensor unit configured to sense a position of the display device; and a processor configured to control the touch sensor unit, the display unit, the transparent display unit and the position sensor unit, wherein the processor is further configured to: detect the second touch input by activating the second touch sensor unit and control the first object displayed in the display unit based on the detected second touch input when a first position, of which the transparent display unit and the display unit are overlapped with each other in a manner that the transparent display unit is folded in an inward direction, is detected, and detect the first touch input and the third touch input respectively by activating the first touch sensor unit and the third touch sensor unit, control the first object displayed in the display unit based on the detected first touch input, and control the second object displayed in the transparent display unit based on the detected third touch input when a second position, of which an angle between the transparent display unit and the display unit is within a predetermined angle range in a manner that the transparent display unit is unfolded, is detected.

Accordingly, the present specification provides the following effects and/or advantages.

According to one embodiment, since a touch sensor unit to be activated is determined according to a position of a detected device, if a touch input scheme appropriate for the position of the device is provided, a user can more easily and efficiently perform a touch input.

According to another embodiment, since a unit for displaying an object is determined according to a position of a detected device, a display scheme can be provided in consideration of characteristic of a transparent display panel.

According to the other embodiment, in case of activating a partial region of a touch sensor unit, since scaling is performed for the activated part of the region, an incorrect operation of a device can be prevented.

A more detail effect and/or advantage of the invention shall be described in detail in the following description.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies. Moreover, although embodiments are explained in detail with reference to the attached drawings and the contents written on the attached drawings, a scope intended to claim may be non-limited or non-restricted by the embodiments. Meanwhile, for clarity, it may abbreviate a terminology 'display device' to a 'device' in the present specification.

Figure 1:
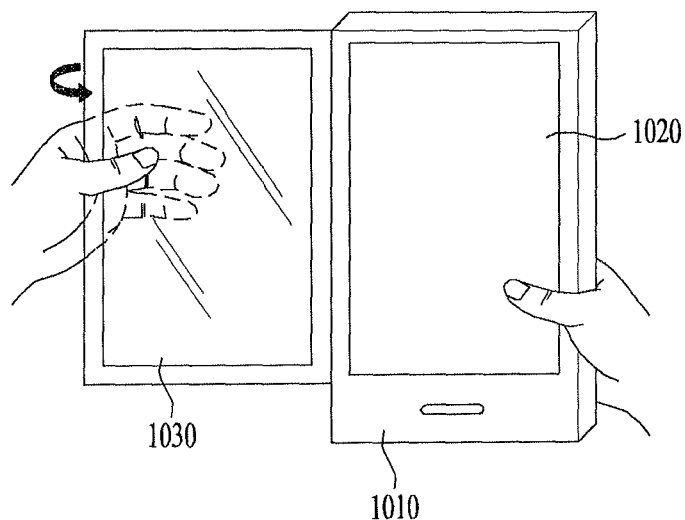
FIG. 1 is a diagram for one embodiment of a display device equipped with a transparent display unit.

FIG. 1 is a diagram for one embodiment of a display device equipped with a transparent display unit.

In the present specification, a device 1010 may be equipped with a transparent display unit 1030. In this case, the transparent display unit 1030 may indicate a unit configured to display an object and consisting of a transparent display panel transmitting light instead of reflecting the light. The transparent display unit 1030 can be installed in the device 1010 in a manner of being folded toward a main body of the device 1010.

In particular, as depicted in the drawing, the transparent display unit 1030 can be installed in the device 1010 in a manner of being folded toward a display unit 1020 installed in the main body of the device 1010. In this case, one side of the transparent display unit 1030 may be connected with one side of the display unit 1020. If the transparent display unit 1030 is folded toward the display unit 1020, the transparent display unit 1030 and the display unit 1020 may overlap with each other. More specifically, if the transparent display unit 1030 is folded toward the display unit 1020, the transparent display unit 1030 and the display unit 1020 may overlap with each other in a manner that the transparent display unit 1030 is positioned at the front of the display unit 1020. Since the transparent display unit 1030 positioned at the front of the display unit 1020 is configured with a transparent display panel, a user can see an object displayed in the display unit 1020 via the transparent display unit 1030.

In the present specification, the device 1020 can determine a position of the device 1010 on the basis of a folding state of the transparent display unit 1030. More specifically, the device 1010 can determine the position of the device 1010 on the basis of a folding or unfolding state of the transparent display unit 1030, a folding or unfolding direction and/or an angle between the transparent display unit 1030 and the display unit 1020, and the like. In the present specification, the device 1010 may have 4 types of position states depending on the folding state of the transparent display unit 1030. Regarding this, it shall be described later with reference to FIG. 3.

Having detected a position according to a folding state of the transparent display unit 1030, the device 1010 can control activation of a touch sensor unit installed in both the transparent display unit 1030 and the display unit 1020. Moreover, the device 1010 can control the transparent display unit 1030 and the display unit 1020 to display an object according to the detected position. Regarding this, it shall be described later with reference to FIG. 3 to FIG. 8.

Figure 2:
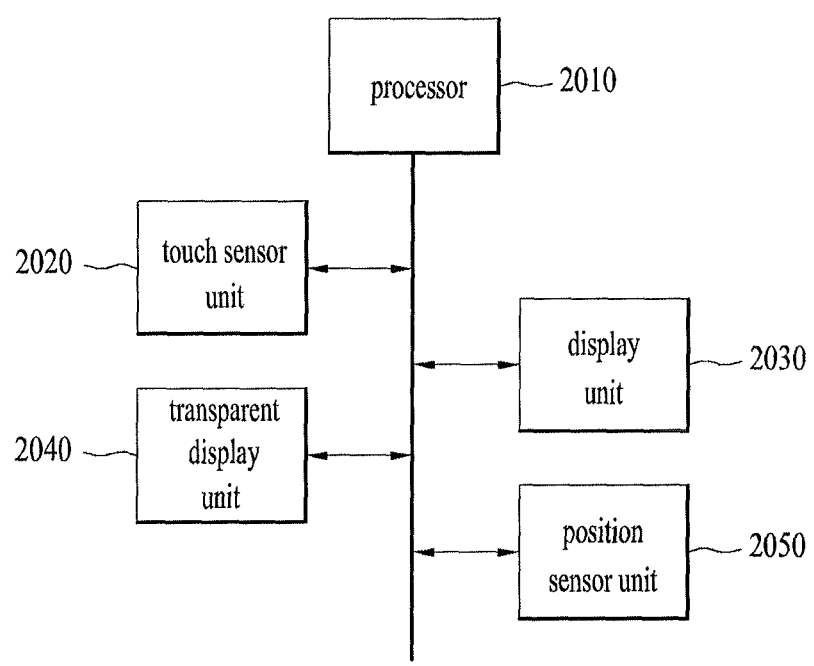
FIG. 2 is a block diagram of a display device according to one embodiment.

FIG. 2 is a block diagram of a display device according to one embodiment. The display device can include a touch sensor unit 2020, a display unit 2030, a transparent display unit 2040, a position sensor unit 2050, and a processor 2010.

The touch sensor unit 2020 can deliver environment, which is recognized by a user input or the device using at least one sensor installed in the device, to the processor 2010. More specifically, the touch sensor unit 2020 can sense a touch input using at least one sensor installed in the device. In this case, the at least one sensing means can include such various sensing means to sense the touch input as a touch sensor, a fingerprint sensor, a motion sensor, a proximity sensor, an illumination sensor, a pressure sensor, and the like. The touch sensor unit 2020 is a common name for the aforementioned various sensing means. The aforementioned sensors can be included in the device as a separate element or can be included in the device in a manner of being integrated to at least one element.

The touch sensor unit 2020 can sense such various contact or non-contact touch inputs as a long-press touch input, a short-press touch input, a drag touch input, a release touch input, a hovering input, a flicking touch input, and the like of a user. Moreover, the touch sensor unit 2020 can sense a touch input inputted by various touch input tools including a touch pen, a stylus pen, and the like and may deliver a sensed result to the processor 2010.

The touch sensor unit 2020 is installed in the display unit 2030 or the transparent display unit 2040 and can sense a touch input on the display unit 2030 or the transparent display unit 2040. In other word, the touch sensor unit 2020 can sense the touch input on the display unit 2030 or the transparent display unit 2040 in a manner of being combined with the display unit 2030 or the transparent display unit 2040. In this case, the touch sensor unit 2020 can form a layer structure with the display unit 2030 or the transparent display unit 2040 according to embodiment. In this case, for clarity of explanation, the present specification may be explained in a manner of identifying the display unit 2030 or the transparent display unit 2040 with the touch sensor unit 2020. Hence, it may represent that a touch input is sensed not only by the touch sensor unit 2020 but the display unit 2030 or the transparent display unit 2040. The following description is explained on the basis of the display unit 2030 equipped with the touch sensor unit 2020 or the transparent display unit 2040.

The display unit can display an object. More specifically, the display unit 2030 can display the object in the front of the display unit 2030. In this case, the display unit can display the object based on a content executed by the processor 2010 or a control command of the processor 2010. In this case, the object may correspond to visual information displayed via a display panel and capable of being recognized by a vision of a user. Hence, the object can include an image, a picture, a text, a video, a photo, an execution screen, and the like as embodiment.

In particular, the display unit 2030 may correspond to a unit consisting of an opaque display panel in the present specification. In doing so, the display unit 2030 can be distinguished from the transparent display unit 2040 described in the following. Moreover, the display unit 2030 is installed in a main body of the device and can perform a function of a main display unit. And, the display unit 2030 can be equipped with the touch sensor unit 2020. Regarding this, it has been already explained in the foregoing description. Hence, the display unit 2030 can sense a touch input on the 'front' of the display unit 2030. More specifically, the display unit 2030 can sense the touch input on the front of the display unit 2030 using the touch sensor unit 2020 installed in the display unit.

The aforementioned explanation regarding the display unit 2030 can be similarly applied to the transparent display unit 2040. Hence, the transparent display unit 2040 can display an object and can be controlled by the processor 2010. And, the transparent display unit 2040 can be equipped with the touch sensor unit 2020. Regarding this, it has been already explained in the foregoing description.

Yet, unlike the display unit 2030, the transparent display unit 2040 can consist of a transparent display panel. Moreover, the transparent display unit 2040 can consist of a transparent flexible display panel. Unlike the display unit 2030, the transparent display unit 2040 includes at least one touch sensor, unit 2020 and can sense a touch input on 'both sides' of the transparent display unit 2040. More specifically, the transparent display unit 2040 can sense the touch input on the both sides of the transparent display unit 2040 using the at least one touch sensor unit 2020 installed in the transparent display unit.

The display unit 2030 and the transparent display unit 2040 can be controlled according to a position of the device detected by a position sensor unit 2050. Regarding this, it shall be described later with reference to FIG. 3 to FIG. 9.

The position sensor unit 2050 can sense a position of the device. The position sensing unit 2050 can sense the position of the device on the basis of the extent of folding or the extent of unfolding of the transparent display unit 2040. More specifically, the position sensor unit 2050 can sense the position of the device by sensing the extent of folding or the extent of unfolding of the transparent display unit 2040. The position of the device can be mainly classified into 4 types. Detailed explanation on each position shall be described later with reference to FIG. 3 to FIG. 8.

The position sensor unit 2050 can sense the position of the device using at least one sensing means installed in the device. In this case, the at least one sensing means can include such various sensing means as a gravity sensor, a terrestrial magnetism sensor, a motion sensor, a gyro sensor, an acceleration sensor, a tilt (inclination) sensor, a brightness sensor, an altitude sensor, a temperature sensor, a depth sensor, a pressure sensor, a bending sensor, a proximity sensor, a camera sensor, a GPS (global positioning system) sensor, a touch sensor, a speed sensor, and the like.

The processor 2010 can execute various applications by processing internal data of the device. And, the processor 2010 can control content executed in the device based on a content control command. And, the processor 2010 controls each of the units of the aforementioned device and may control data transmission/reception between units.

The processor 2010 detects a position of the device using the position sensor unit 2050 and can control activation of each unit based on the detected position. As one embodiment, having detected the position of the device, the processor 2010 can control activation of the display unit 2030 and that of the touch sensor unit 2020 installed in the transparent display unit 2040 based on the detected position. As a different embodiment, having detected the position of the device, the processor 2010 can control activation of the display unit 2030 and that of the transparent display unit 2040 based on the detected position. In other word, the processor 2010 can control the display unit 2030 or the transparent display unit 2040 to display or not to display an object based on the detected position. Regarding this, it shall be described later with reference to FIG. 4 to FIG. 6 and FIG. 8.

Moreover, the processor 2010 can control an object displayed in the display unit 2030 based on a touch input on the transparent display unit 2040. This is designed for a user to more easily and efficiently control the device according to a position of the device. Regarding this, it shall be also described later with reference to FIG. 4 to FIG. 6 and FIG. 8.

In the following description, if each step or operation performed in the device is initialized or performed by sensing a user input (e.g., touch input), although explanation on a process of generating and receiving a signal according to the sensed user input is not repeatedly explained, assume that the explanation on the aforementioned process is included. And, it may represent that the processor 2010 controls the device or at least one unit included in the device according to the user input and it may explain the processor 2010 and the device in a manner of identifying the processor with the device.

Meanwhile, the device depicted in FIG. 2 is a block diagram according to one embodiment. Blocks represented in a manner of being separated indicate the logically distinguished elements of the device. Hence, the elements of the aforementioned device may be equipped with a single chip or a plurality of chips according to the design of the device.

In the following description, for clarity, the touch sensor unit 2020 installed in the display unit 2030 is named a 'first touch sensor unit'. The first touch sensor unit can detect a 'first touch input' corresponding to a touch input on the front side of the display unit 2030. And, the touch sensor units 2020 installed in both sides of the transparent display unit 2040 are named a 'second touch sensor unit' and a 'third touch sensor unit', respectively. The second touch sensor unit can detect a 'second touch input' on the front side of the transparent display unit 2040 and the third touch sensor unit can detect a 'third touch input' on the back side of the transparent display unit 2040.

Figure 3:
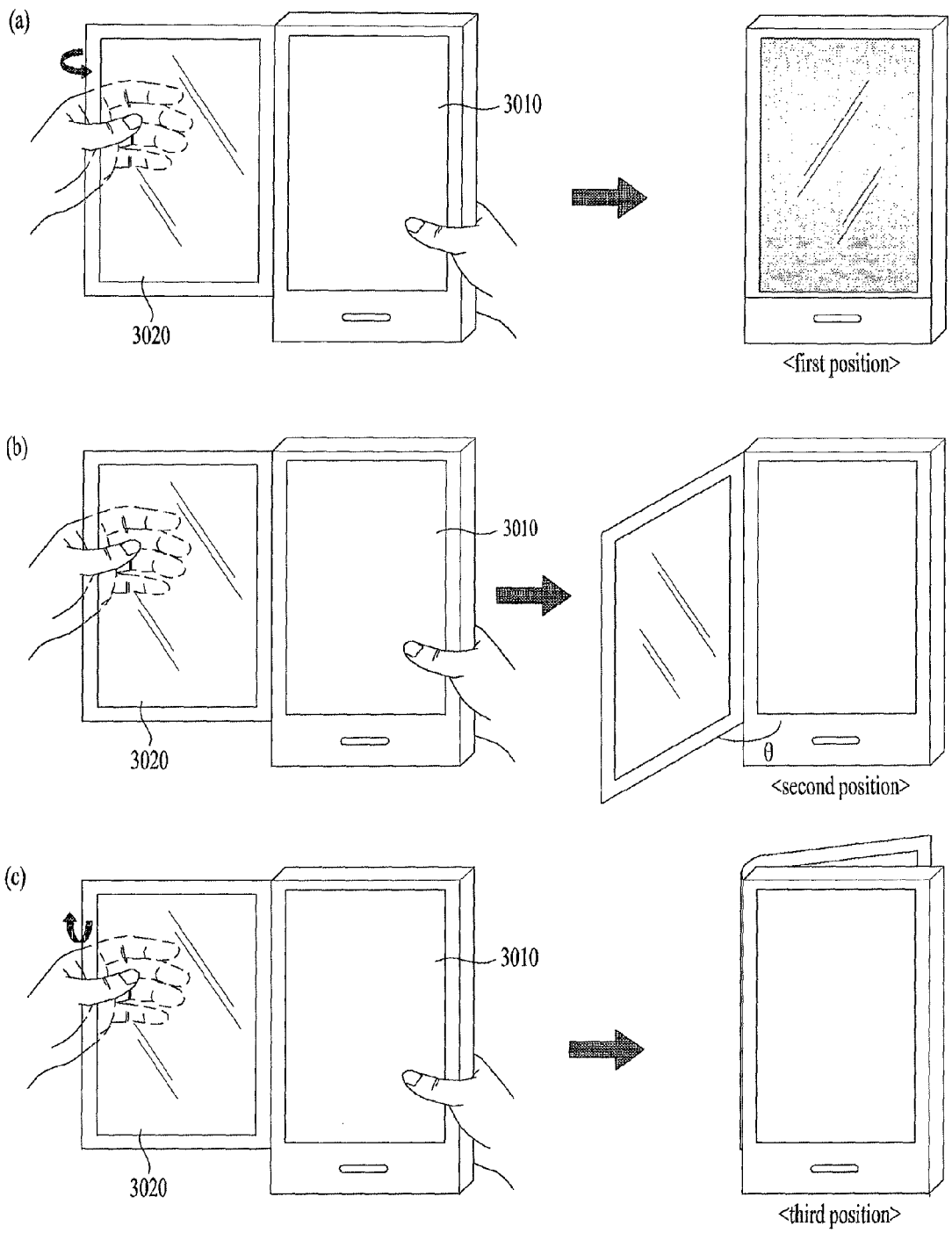
FIG. 3 is a diagram for embodiments of positions of a display device according to a position.

FIG. 3 is a diagram for embodiments of positions of a display device according to a position.

The device can detect a position of the device on the basis of the extent of folding or the extent of unfolding of the transparent display unit 3020. In this case, the device can use the position sensor unit mentioned earlier with reference to FIG. 2. In the present specification, the device can mainly detect four kinds of positions as the position of the device.

As one embodiment, the device can detect a 'first position' of which the transparent display unit 3020 is folded in inward direction. More specifically, the device can detect a position of which the transparent display unit 3020 and the display unit 3010 are overlapped with each other in a manner that the transparent display unit 3020 is folded in inward direction as the 'first position'. Or, the device can detect the position of which the transparent display unit 3020 and the display unit 3010 are overlapped with each other in a manner that the transparent display unit 3020 is folded to be positioned at the front side of the display unit 3010 as the 'first position'. Hence, the first position may indicate a state that the back side of the transparent display unit 3020 and the front side of the display unit 3010 face each other or a state that the back side of the transparent display unit 3020 and the front side of the display unit 3010 are met. When the device is in the first position, since the transparent display unit 3020 is positioned at the front of the display unit 3010, a user can see the display unit 3010 through the transparent display unit 3020.

As a different embodiment, the device can detect a 'second position' of which the transparent display unit 3020 is unfolded. More specifically, the device can detect a position of which an angle (θ) between the transparent display unit 3020 and the display unit 3010 is within a predetermined angle range in a manner that the transparent display unit 3020 is unfolded as the 'second position'. Hence, as depicted in the drawing, the second position may indicate the position that the back side of the transparent display unit 3020 and the front side of the display unit 3010 face an identical direction. In this case, the identical direction indicates a 'practically' identical direction and may allow a prescribed error range. Hence, in the present specification, the 'identical direction' may indicate the 'practically identical direction' of the prescribed error range as well as an exactly identical direction. Meanwhile, in this case, the predetermined angle range can be determined by various values depending on a manufacturing process of a manufacturer, a designing scheme of the device, a structure, a purpose, a design, an application in progress, and the like.

As a different embodiment, the device can detect a 'third position' of which the transparent display unit 3020 is folded in outward direction. More specifically, the device can detect a position of which the transparent display unit 3020 and the display unit 3010 are overlapped with each other in a manner that the transparent display unit 3020 is folded in outward direction as the 'third position'. Or, the device can detect the position of which the transparent display unit 3020 and the display unit 3010 are overlapped with each other in a manner that the transparent display unit 3020 is folded to be positioned at the back side of the display unit 3010 as the 'third position'. Hence, the third position may indicate a state that the front side of the transparent display unit 3020 and the back side of the display unit 3010 face each other or a state that the front side of the transparent display unit 3020 and the back side of the display unit 3010 are met. If the display unit 3010 is installed in the main body of the device, the back side of the display unit 3010 may correspond to the back side of the main body of the device in the present embodiment.

Moreover, as an additional embodiment, the device can detect a fourth position of which an angle (θ) formed by the transparent display unit 3020 and the display unit 3010 is less than a predetermined angle range. Regarding this, it shall be described in detail with reference to FIG. 8.

Figure 4:
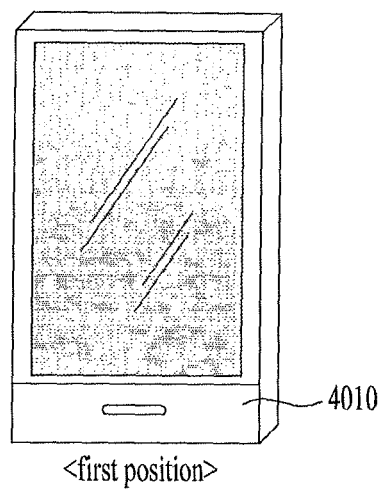
FIG. 4 is a diagram for one embodiment of a display device detecting a first position.
Figure 4:
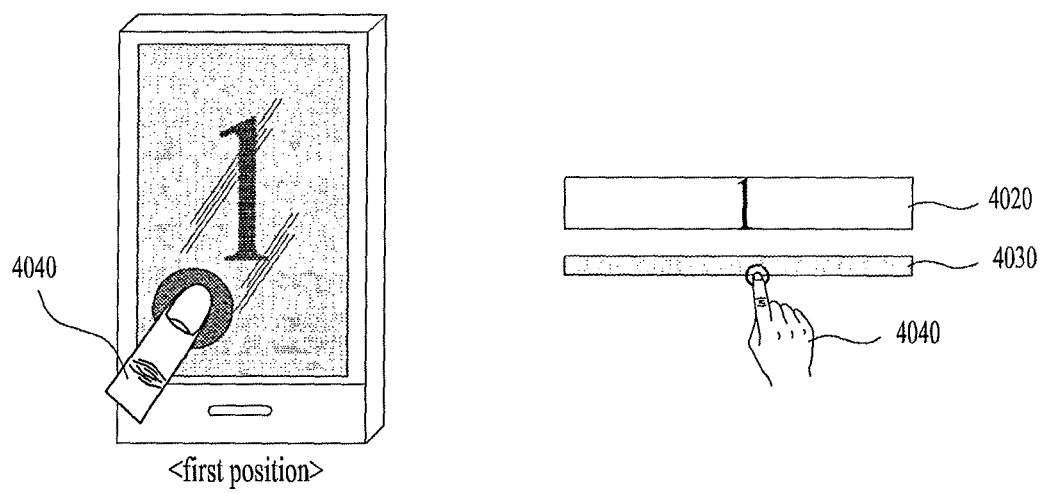
Figure 4:

FIG. 4 is a diagram for one embodiment of a display device detecting a first position.

The device 4010 can detect a first position of which the transparent display unit 4030 and the display unit 4020 are overlapped with each other in a manner that the transparent display unit 4030 is folded in inward direction. Having detected the first position, the device 4010 can control each unit installed in the device 4010. More specifically, if the device detects the first position, the device 4010 can control the touch sensor unit, the display unit 4020, and the transparent display unit 4030 in response to the detected first position.

First of all, as one embodiment, having detected the first position, the device 4010 can control activation of the touch sensor unit. More specifically, if the device 4010 detects the first position, the device can activate a second touch sensor unit installed in the transparent display unit 4030. As a result, the device 4010 can detect a second touch input 4040 on the front side of the transparent display unit 4030. In this case, the device 4010 can inactivate a first touch sensor unit of the display unit 4020 and a third touch sensor unit of the transparent display unit 4030. This is because, since the display unit 4020 is covered by the transparent display unit 4030 in the first position, it is difficult or impossible to perform a touch input on the back side of the transparent display unit 4030 and the front side of the display unit 4020 although it is possible to perform the touch input on the front side of the transparent display unit 4030. By doing so, unnecessary power consumption can be avoided by the device 4010 in a manner that the unnecessary touch sensor unit is inactivated.

As a different embodiment, having detected the first position, the device 4010 can control the display unit 4020 and the transparent display unit 4030 to display an object. More specifically, if the device detects the first position, the device can control the display unit 4020 to display a first object (1). In this case, the first object (1) may correspond to various visual information displayed in the display unit 4020. Since the transparent display unit 4030 consisting of a transparent display panel transmitting light transmits light, despite the transparent display unit 4030 is positioned at the front of the display unit 4020, a user can see the object displayed in the display unit 4020.

As a combination of the aforementioned embodiments, if the device 4010 detects the first position, the device displays the first object (1) in the display unit 4020 and activates the second touch sensor unit at the same time to detect the second touch input 4040 on the front side of the transparent display unit 4030. In this case, the device 4010 can detect the second touch input 4040 on the basis of the first object (1) displayed in the display unit 4020. More specifically, having detected the first position, the device 4010 detects the second touch input 4040 in a manner of activating the second touch sensor unit and can control the first object (1) displayed in the display unit 4020 based on the detected second touch input 4040. For instance, if an icon is displayed in the display unit 4020 as the first object (1) and a drag touch input for moving the icon is detected as the second touch input 4040, the device 4010 can move the icon according to the detected drag touch input.

In particular, in the present embodiment, a unit for displaying an object and a unit for detecting a touch input to control the object may be different from each other. Hence, a user can control the first object (1) in a manner of recognizing the first object (1) displayed in the display unit 4020 through the transparent display unit 4030 and touching the front side of the transparent display unit 4030.

Figure 5:
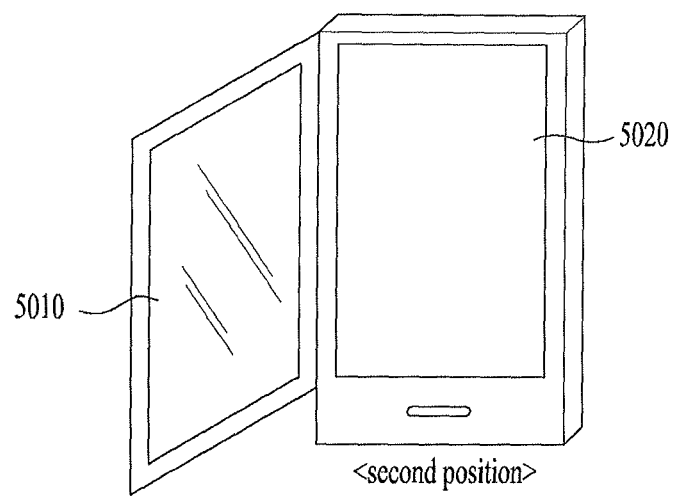
FIG. 5 is a diagram for one embodiment of a display device detecting a second position.
Figure 5:
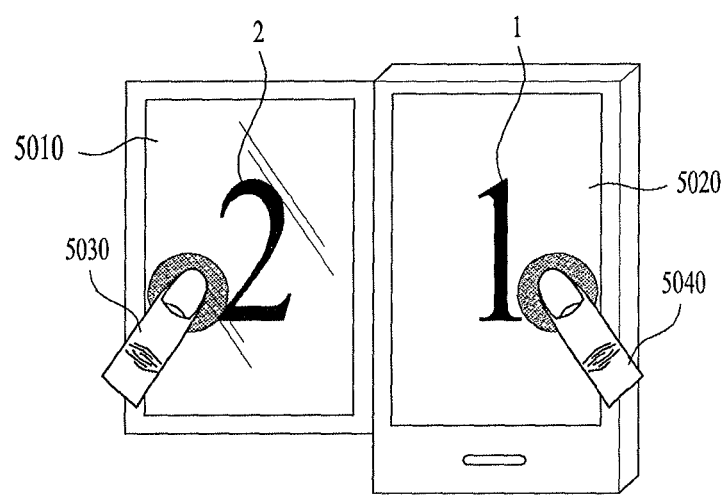

FIG. 5 is a diagram for one embodiment of a display device detecting a second position.

The device can detect a second position of which the transparent display unit 5010 is unfolded. More specifically, the device can detect the second position of which an angle formed by the transparent display unit 5010 and the display unit 5020 is within a predetermined angle range in a manner that the transparent display unit 5010 is unfolded in outward direction. Having detected the second position, the device can control each unit installed in the device. More specifically, if the device detects the second position, the device can control the touch sensor unit, the display unit 5020, and the transparent display unit 5010 in response to the second position.

First of all, as one embodiment, having detected the second position, the device can control activation of the touch sensor unit. More specifically, if the device detects the second position, the device can activate a first touch sensor unit installed in the display unit 5020 and a third touch sensor unit installed in the transparent display unit 5010. As a result, the device can detect a first touch input 5040 on the front side of the display unit 5020 and a third touch input on the back side of the transparent display unit 5010.

In this case, the device can inactivate a second touch sensor unit installed in the transparent display unit 5010. This is designed to reflect an intention of a user who is intending to use the transparent display unit 5010 and the display unit 5020 at the same time by unfolding the transparent display unit 5010. Hence, in the second position, the device can activate each of the touch sensor units respectively installed in the back side of the transparent display unit 5010 and the front sides of the display unit 5020 to make a user easily perform a touch input. Moreover, unnecessary power consumption can be avoided by inactivating the touch sensor unit, which is not necessary in the second position of the device. Yet, this is just an example. According to embodiment, the second touch sensor unit can be additionally activated together with the first and the third touch sensor unit to simultaneously detect touch inputs on both sides of the transparent display unit 5010.

As a different embodiment, having detected the second position, the device can control the display unit 5020 and the transparent display unit 5010 to display an object. More specifically, if the device detects the second position, the device can control the transparent display unit 5010 to display a second object (2). And, having detected the second position, the device can control the display unit 5020 to display the first object (1).

In this case, the second object (2) may correspond to various visual informations displayed in the transparent display unit 5010. Moreover, according to embodiment, the second object (2) may correspond to an object contiguous with the first object (1). For instance, the second object (2) can construct a contiguous picture with the first object (1). And, according to embodiment, the second object (2) may correspond to an object including additional information on the first object (1). For instance, if the first object corresponds to a picture, the second object (2) may correspond to an object including information on a date, time, a place and the like of capturing the picture as the additional information on the picture.

As a combination of the aforementioned embodiments, if the device detects the second position, the device displays the first object (1) in the display unit 5020 and activates the first touch sensor unit at the same time to detect the first touch input 5040 on the front side of the display unit 5020. In this case, the device can control the first object (1) based on the detected first touch input 5040. And, having detected the second position, the device displays the second object (2) in the transparent display unit 5010 and activates a third touch sensor unit at the same time to detect a third touch input 5030 on the back side of the transparent display unit 5010. In this case, the device can control the second object (2) based on the detected third touch input 5030.

Figure 6:
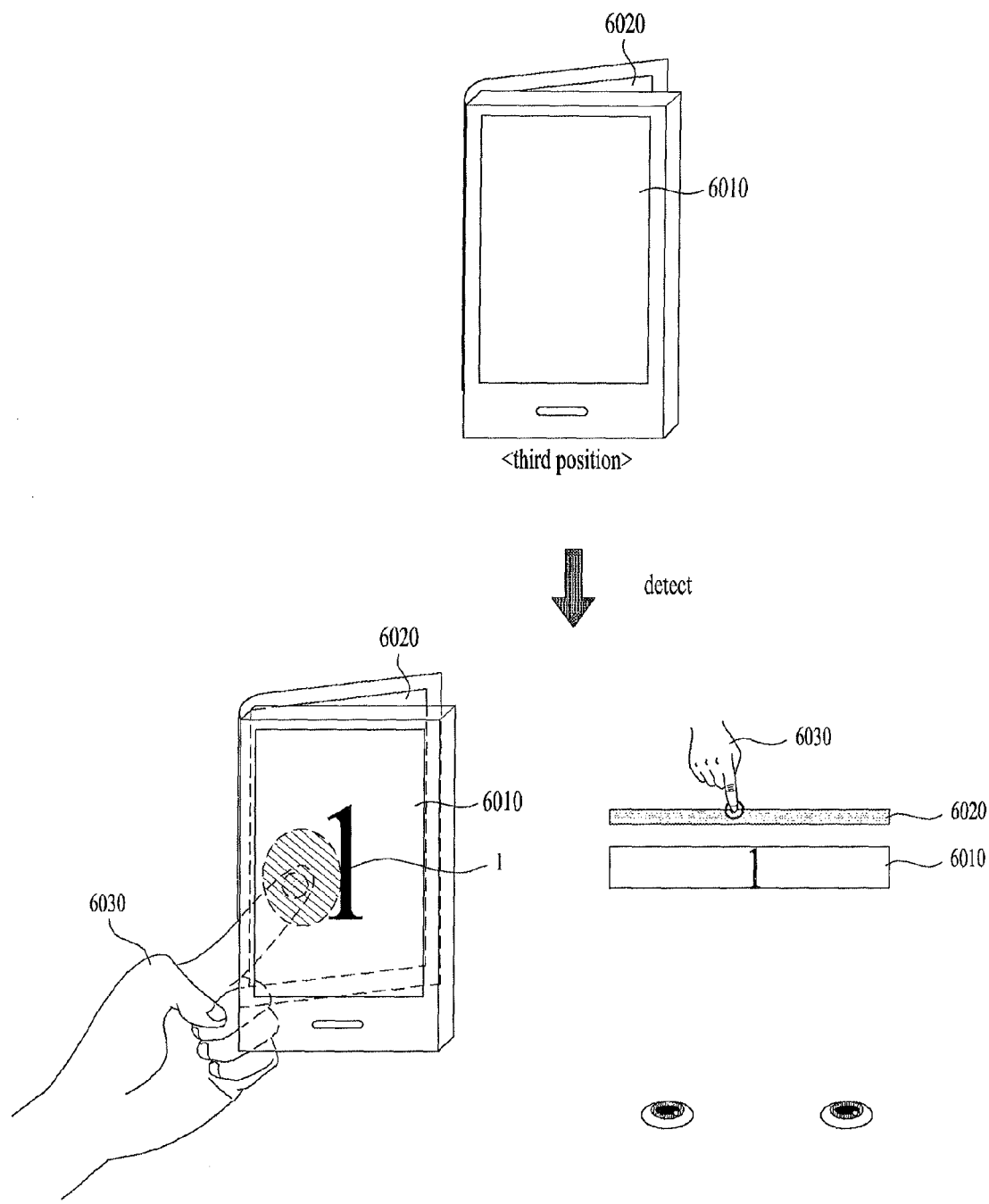
FIG. 6 is a diagram for one embodiment of a display device detecting a third position.

FIG. 6 is a diagram for one embodiment of a display device detecting a third position.

The device can detect a third position of which the display unit 6010 and the transparent display unit 6020 are overlapped with each other in a manner that the transparent display unit. 6020 is folded in outward direction. Having detected the third position, the device can control each unit installed in the device. More specifically, if the device detects the third position, the device can control the touch sensor unit, the display unit 6010, and the transparent display unit 6020 in response to the detected third position.

First of all, as one embodiment, having detected the third position, the device can activate a first touch sensor unit of the display unit 6010 and a third touch sensor unit of the transparent display unit 6020. As a result, the device can detect a first touch input on the front side of the display unit 6010 and a third touch input 6030 on the back side of the transparent display unit 6020. In particular, the device can detect the third touch input 6030 on a part of the back side of the transparent display unit 6020 by activating a partial region of the third touch sensor unit in the third position. Regarding this, it shall be described in detail with reference to FIG. 7.

In this case, the device can inactivate the second touch sensor unit of the transparent display unit 6020. This is because, since the front side of the transparent display unit 6020 and the back side of the display unit 6010 are in a state of facing each other or being met, it is difficult or impossible for a user to perform a touch input on the front side of the transparent display unit 6020. By doing so, unnecessary power consumption can be avoided by the device in a manner that the unnecessary touch sensor unit is inactivated.

As a different embodiment, having detected the third position, the device can control the display unit 6010 and the transparent display unit 6020 to display an object. More specifically, if the device detects the third position, the device can control the display unit 6010 to display a first object (1).

As a combination of the aforementioned embodiments, if the device detects the third position, the device displays the first object (1) in the display unit 6010 and activates the first touch sensor unit at the same time to detect the first touch input on the front side of the display unit 6010. Moreover, the device can detect a third touch input 6030 for the back side of the transparent display unit 6020 by activating the third touch sensor unit. In this case, the device can detect the first touch input and the third touch input 6030 on the basis of the first object (1) displayed in the display unit 6010. More specifically, having detected the third position, the device detects the first touch input and the third touch input in a manner of activating the first and the third touch sensor unit and can control the first object (1) displayed in the display unit 6010 based on the detected first touch input or the third touch input 6030. For instance, if an icon is displayed in the display unit 6010 as the first object (1) and a drag touch input for moving the icon is detected as the first touch input or the third touch input 6030, the device can move the icon according to the detected drag touch input.

In particular, in the present embodiment, a unit for displaying an object and a unit for detecting a touch input to control the object may be identical to each other or different from each other. Hence, a user can indirectly control the first object (1) in a manner of touching the transparent display unit 6020 positioned at the back side of the device. Or, the user can control the first object (1) in a manner of directly touching the first object (1) displayed in the display unit 6010.

Figure 7:
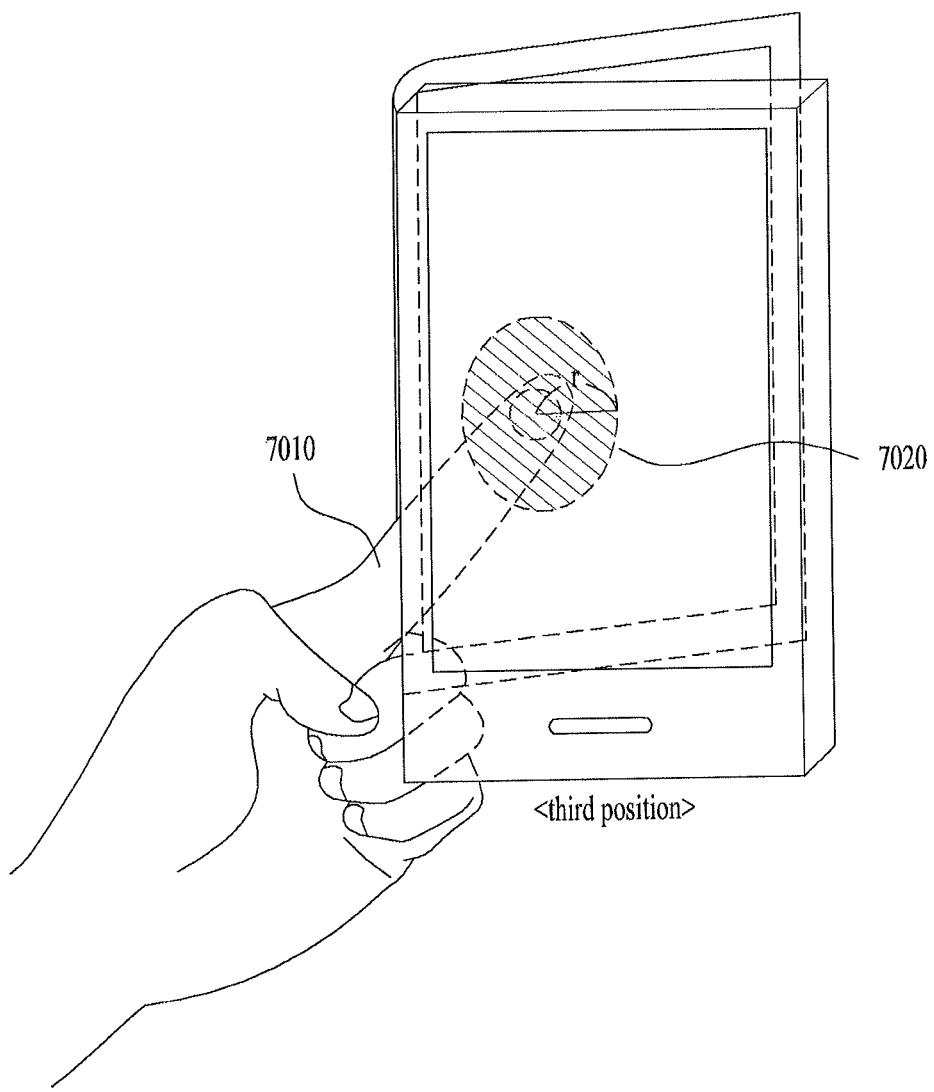
FIG. 7 is a diagram for one embodiment of a display device controlling activation of a third touch sensor unit and performing a scaling in case that a third position is detected.

FIG. 7 is a diagram for one embodiment of a display device controlling activation of a third touch sensor unit and performing a scaling in case that a third position is detected.

If the third touch sensor unit is activated, the device can differently determine regions in which the third touch sensor unit is activated in the second position and the third position, respectively. More specifically, if the device detects the second position, the device can detect a third touch input 7010 on the whole of the back side of the transparent display 7010 in a manner of activating overall region of the third touch sensor unit. On the contrary, if the device detects the third position, the device can detect the third touch input 7010 on a part of the back side of the transparent display unit by activating a partial region of the third touch sensor unit.

In case of the second position, a user can control the second object by directly touching the second object displayed in the transparent display unit. Yet, in case that the user controls the first object using the third touch input 7010 in the third position, the user indirectly controls the first object by touching the transparent display unit positioned at the back side of the device. Hence, it is not necessary for the device to activate the overall region of the third touch sensor unit. Moreover, although a touch region of the back side capable of being used by the user is limited, there is no problem of controlling the first object. Yet, in this case, it is necessary to perform a scaling on the activated partial region 7020. Regarding this, it shall be described in detail in the following. Hence, the device can prevent the device from consuming unnecessary power and can make the user more easily and conveniently control the first object in a manner of activating the partial region 7020 of the third touch sensor unit.

In case of activating the partial region 7020 of the third touch sensor unit, the device can determine a region 7020 to be activated on the basis of an initially detected third touch input 7010. More specifically, having detected the third position, the device can detect the third touch input 7010 on the back side of the transparent display unit. In this case, the device can determine a region positioned within a predetermined radius (r) on the basis of a position of the initially detected third touch input 7010 as an activation region 7020.

If the activation region 7020 is determined on the basis of the detected third input, the device can detect the third touch input 7010 in a manner of performing a scaling on the determined activation region 7020. As one embodiment, the device can detect the third touch input 7010 by performing the scaling on the basis of a ratio of the activation region 7020 for the overall region of the third touch sensor unit. For instance, if the device in the second position performs a first command for the third touch input 7010 with a length of 1 cm, the device in the third position can perform the identical first command for the third touch input 7010 with a length of ¼ cm. In this case, ¼ value may correspond to a ratio of an activated partial region 7020 for the overall region of the third touch sensor unit.

As mentioned in the foregoing description, the device detects the third touch input 7010 after performing a scaling on the activated partial region 7020 to prevent the device from an incorrect operation and to make a user more easily and conveniently control the first object.

Figure 8:
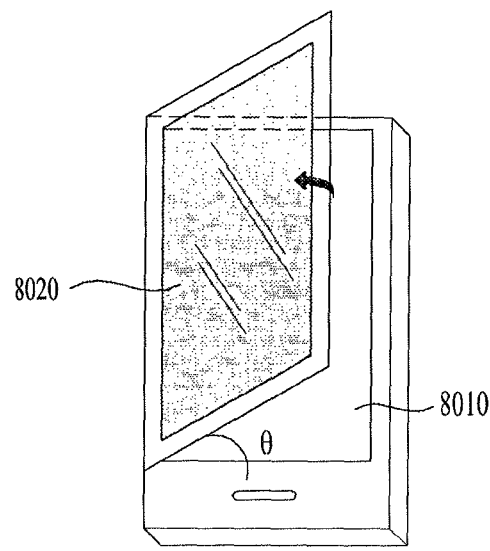
FIG. 8 is a diagram for one embodiment of a display device detecting a fourth position.
Figure 8:
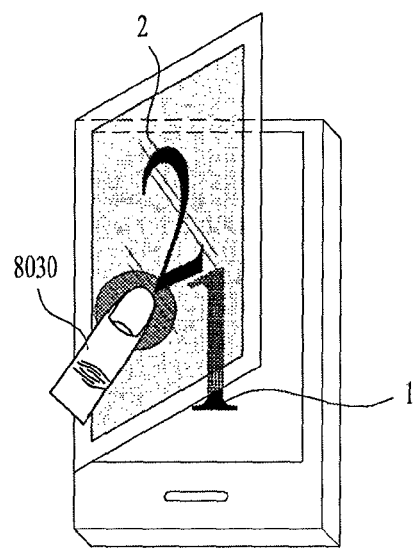
Figure 8:
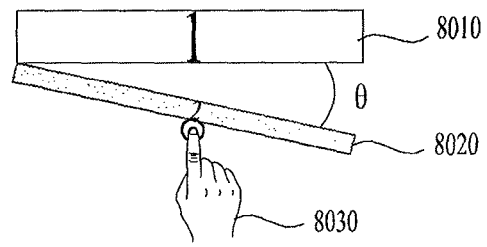

FIG. 8 is a diagram for one embodiment of a display device detecting a fourth position.

The device can detect a fourth position of which the transparent display unit 8020 is unfolded. More specifically, the device can detect the fourth position of which an angle (θ) formed by the transparent display unit 8020 and the display unit 8010 is less than a predetermined angle range in a manner that the transparent display unit 8020 is unfolded in outward direction. In this case, the predetermined angle range may correspond to an angle range identical to the angle range to detect the second position. In case that the angle (θ) formed by the transparent display unit 8020 and the display unit 8010 is less than the predetermined angle range, it may correspond to a case that the angle between the transparent display unit 8020 and the display unit 8010 is smaller than a minimum angle within the predetermined angle range. Hence, if the transparent display unit 8020 is unfolded, a position of the device may change in an order of the first position→a fourth position→the second position.

Having detected the fourth position, the device can control each unit installed in the device. More specifically, if the device detects the fourth position, the device can control the touch sensor unit, the display unit 8010, and the transparent display unit 8020.

First of all, as one embodiment, having detected the fourth position, the device can control activation of a touch sensor unit. More specifically, if the device detects the fourth position, the device can activate a first touch sensor unit of the transparent display unit 8020 and a second touch sensor unit of the display unit 8010. As a result, the device can detect a first touch input on the front side of the display unit 8010 and a second touch input on the front side of the transparent display unit 8020.

As a different embodiment, having detected the fourth position, the device can control the display unit 8010 and the transparent display unit 8020 to display an object. More specifically, if the device detects the fourth position, the device can control the display unit 8010 to display a first object (1). And, if the device detects the fourth position, the device can control the transparent display unit 8020 to display a second object (2).

As a combination of the aforementioned embodiments, if the device detects the fourth position, the device displays the first object (1) in the display unit 8010 and activates the first touch sensor unit at the same time to detect the first touch input on the front side of the display unit 8010. In this case, the device can control the first object (1) based on the detected first touch input. And, if the device detects the fourth position, the device displays the second object (2) in the transparent display unit 8020 and activates the second touch sensor unit at the same time to detect the second touch input 8030 on the front side of the transparent display unit 8020. In this case, the device can control the second object (2) based on the detected second touch input 8030.

Meanwhile, although it is not depicted in the drawing, if a position of the device changes from the fourth position to the second position in a manner that the transparent display unit 8020 is unfolded, the device can display the second object (2) in a manner of reversing the left and right of the second object. This is because, if the position of the device changes from the fourth position to the second position, a face of the transparent display 8020 facing a user varies. More specifically, in case of the fourth position, the front side of the transparent display unit 8020 may practically face the user. On the contrary, in case of the second position, the back side of the transparent display unit 8020 may practically face the user. Hence, in order to display the second object (2) on the basis of the face facing the user, the device can display the second object in a manner of reversing the left and right of the second object according to a position change.

Figure 9:
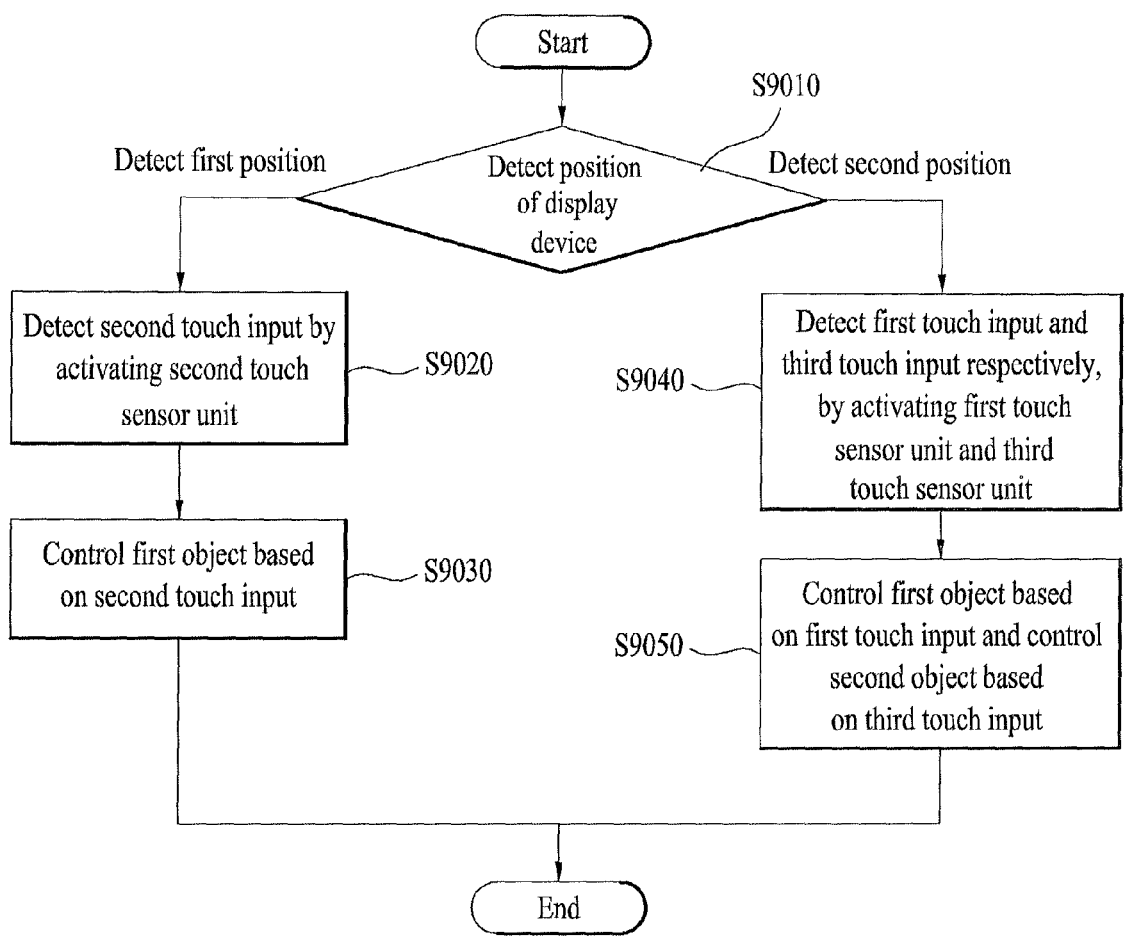
FIG. 9 is a flowchart of a method of controlling a display device according to one embodiment.

FIG. 9 is a flowchart of a method of controlling a display device according to one embodiment. In the present flowchart, detail information on a part similar to or duplicated with the content mentioned earlier in FIG. 1 to FIG. 8 is omitted.

First of all, the device can detect a position of the device [S9010]. The device can detect the position of the device based on the extent of folding or the extent of unfolding of the transparent display unit. The device can detect a position of which the transparent display unit is folded in inward direction as a first position. And, the device can detect a position of which an angle formed by the transparent display unit and the display unit is within a predetermined angle range as a second position. Detailed explanation on each position has already been described with reference to FIG. 3.

If the first position is detected, the device can detect a second touch input in a manner of activating a second touch sensor unit [S9020]. More specifically, having detected the first position, the device can activate the second touch sensor unit of the transparent display unit. As a result, the device can detect the second touch input in front side of the transparent display unit.

Subsequently, the device can control a first object based on the second touch input detected in the previous step S9020. In particular, the device can control the first object displayed in the display unit based on the second touch input on the front side of the transparent display unit. In this case, the first object may correspond to various visual informations displayed in the display unit. Besides, detailed information on device operations in the first position has already been described with reference to FIG. 4.

If the second position is detected in the step S9010, the device can detect a first touch input and a third touch input in a manner of activating a first touch sensor unit and a third touch sensor unit, respectively [S9040]. More specifically, if the second position is detected, the device can activate the first touch sensor unit of the display unit and the third touch sensor unit of the transparent display unit. As a result, the device can detect a first touch input on the front side of the display unit and a third touch input on the back side of the transparent display unit.

Subsequently, the device can control a first object and a third object based on the first touch input and the third touch input, respectively, which are detected in the previous step S9040 [S9050]. More specifically, the device can control the first object displayed in the front side of the display unit based on the first touch input on the front side of the display unit. And, the device can control the second object displayed in the transparent display unit based on a third touch input on the back side of the transparent display unit. In this case, the second object may correspond to various visual information displayed in the transparent display unit. Beside, detailed information on device operations in the second position has already been described with reference to FIG. 5.

Meanwhile, although it is not depicted in the present flowchart, the device can additionally detect a third position and a fourth position. The device can detect a position of which the transparent display unit is folded in outward direction as the third position. And, the device can detect a position of which an angle formed by the transparent display unit and the display unit is less than a predetermined angle range in a manner that the transparent display unit is unfolded as the fourth position. If the device detects the third position or the fourth position, the device can control each of the units installed in the device in response to the detected position. Regarding this, it has already been described in detail with reference to FIG. 6 to FIG. 8.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

And, a device and a method of controlling therefor may not limitedly apply to the composition and method of the aforementioned embodiments. The aforementioned embodiments can be configured in a manner of being selectively combined the whole of the embodiments or a part of the embodiments to achieve various modifications.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

Meanwhile, a device and a method of controlling therefor of the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the Internet and the like is also included in the recording media. And, since the recording media readable by the processor are distributed to the computers connected by a network, codes readable by the processor can be stored and executed in a manner of being distributed.

And, it can be considered that an angle and a direction described in the present specification may indicate not only a precise value but also a practical angle and a direction in a prescribed range. In particular, the angle and the direction described in the present specification may correspond to a practical angle and direction. And, there may exist an error of a prescribed range.

And, both an apparatus invention and a method invention are explained in the present specification and the explanation on the both of the inventions can be complementally applied, if necessary.

What is claimed is:

1. A display device, comprising:
a touch sensor unit configured to sense a touch input;
a display unit configured to display a first object and sense a first touch input on a front side of the display unit in a manner of being equipped with a first touch sensor unit;
a transparent display unit configured to display a second object and respectively sense a second touch input on a front side of the transparent display unit and a third touch input on a back side of the transparent display unit in a manner of being equipped with a second touch sensor unit and a third touch sensor unit wherein the transparent display unit is connected with the display unit;
a position sensor unit configured to sense a position of the display device; and
a processor configured to control the touch sensor unit, the display unit, the transparent display unit and the position sensor unit,
wherein the processor is further configured to:
detect the second touch input by activating the second touch sensor unit and control the first object displayed in the display unit based on the detected second touch input when a first position, of which the transparent display unit and the display unit are overlapped with each other in a manner that the transparent display unit is folded in an inward direction, is detected,
detect the first touch input and the third touch input respectively by activating the first touch sensor unit and the third touch sensor unit, control the first object displayed in the display unit based on the detected first touch input, and control the second object displayed in the transparent display unit based on the detected third touch input when a second position, of which an angle between the transparent display unit and the display unit is within a predetermined angle range in a manner that the transparent display unit is unfolded, is detected,
detect the first touch input by activating the first touch sensor unit and detect the second touch input by activating the second touch sensor unit when a fourth position, of which the angle between the transparent display unit and the display unit is less than the predetermine angle range in a manner that the transparent display unit is unfolded, is detected,
when the fourth position is detected, respectively display the first object in the display unit and the second object in the transparent display unit,
when the first touch input is detected, control the displayed first object based on the detected first touch input, and
when the second touch input is detected, control the displayed second object based on the detected second touch input.

2. The display device of claim 1, wherein the processor is further configured to:
inactivate the first touch sensor unit and the third touch sensor unit when the first position is detected, and
inactivate the second touch sensor unit when the second position is detected.

3. The display device of claim 1, wherein the back side of the transparent display unit corresponds to a side facing the front side of the display unit when the transparent display unit is folded in the inward direction.

4. The display device of claim 1, wherein the first position corresponds to a position of which the transparent display unit and the display unit are overlapped with each other to make the transparent display unit be positioned in front of the display unit.

5. The display device of claim 1, wherein the processor is further configured to respectively detect the first touch input and the third touch input by activating the first touch sensor unit and the third touch sensor unit when a third position, of which the front side of the transparent display unit and the back side of the display unit face each other in a manner that the transparent display unit is folded in an outward direction, is detected.

6. The display device of claim 5, wherein, when the third position is detected, the processor is further configured to inactivate the second touch sensor unit.

7. The display device of claim 5, wherein the processor is further configured to:
detect the third touch input on an overall region of the back side of the transparent display unit by activating the overall region of the third touch sensor unit when the second position is detected, and
detect the third touch input on a partial region of the back side of the transparent display unit by activating the partial region of the third touch sensor unit when the third position is detected.

8. The display device of claim 7, wherein the processor is further configured to determine the partial region based on a position of the third touch input firstly detected after the third position is detected.

9. The display device of claim 8, wherein the processor is further configured to determine a region within a predetermined radius as the partial region based on the position of the firstly detected third touch input.

10. The display device of claim 7, wherein, when the partial region of the third touch sensor unit is activated, the processor is further configured to detect the third touch input by performing a scaling on the activated partial region.

11. The display device of claim 5, wherein, when the third position is detected, the processor is further configured to detect the third touch input using the third touch sensor unit installed in the back side of the transparent display unit and control the first object displayed in the display unit based on the detected third touch input.

12. The display device of claim 1, wherein, when switching from the fourth position to the second position is detected, the processor is further configured to:
reverse left and right of the second object displayed in the transparent display unit of the fourth position, and
display the reversed second object in the transparent display unit of the second position.

13. The display device of claim 1, wherein the second object corresponds to an object connected with the first object or an object containing additional information on the first object.

14. The display device of claim 1, wherein the transparent display unit consists of a transparent flexible display panel.

15. A method of controlling a display device containing a display unit configured to display a first object and a transparent display unit configured to be connected with the display unit and display a second object, the method comprising:
detecting a position of the display device,
wherein the position contains a first position of which the transparent display unit and the display unit are overlapped with each other in a manner that the transparent display unit is folded in an inward direction and a second position of which an angle between the transparent display unit and the display unit is within a predetermined angle range in a manner that the transparent display unit is unfolded;

when the first position is detected, detecting a second touch input on a front side of the transparent display unit by activating a second touch sensor unit installed in the transparent display unit and controlling the first object displayed in the display unit based on the detected second touch input;

when the second position is detected, detecting a first touch input on a front side of the display unit by activating a first touch sensor unit installed in the display unit, detecting a third touch input on a back side of the transparent display unit by activating a third touch sensor unit installed in the transparent display unit, controlling the first object displayed in the display unit based on the detected first touch input, and controlling the second object displayed in the transparent display unit based on the detected third touch input;

detecting the first touch input by activating the first touch sensor unit and detecting the second touch input by activating the second touch sensor unit when a fourth position, of which the angle between the transparent display unit and the display unit is less than the predetermine angle range in a manner that the transparent display unit is unfolded, is detected;

when the fourth position is detected, respectively displaying the first object in the display unit and the second object in the transparent display unit;

when the first touch input is detected, controlling the displayed first object based on the detected first touch input; and when the second touch input is detected, controlling the displayed second object based on the detected second touch input.

16. The method of claim 15, wherein the position contains a third position of which the front side of the transparent display unit and the back side of the display unit face each other in a manner that the transparent display unit is folded in an outward direction, and when the third position is detected, the method further comprises detecting respectively the first touch input and the third touch input by activating the first touch sensor unit and the third touch sensor unit.

17. The method of claim 16, wherein when the third position is detected, the method further comprises detecting the third touch input using the third touch sensor unit installed in the back side of the transparent display unit and controlling the first object displayed in the display unit based on the detected third touch input.

\* \* \* \* \*